(12) United States Patent
Birk

(10) Patent No.: US 6,394,028 B1
(45) Date of Patent: May 28, 2002

(54) AUTOMATIC MILKING APPARATUS

(75) Inventor: Uzi Birk, Huddinge (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 09/554,428

(22) PCT Filed: Nov. 9, 1998

(86) PCT No.: PCT/SE98/02015

§ 371 Date: May 25, 2000

§ 102(e) Date: May 25, 2000

(87) PCT Pub. No.: WO99/25176

PCT Pub. Date: May 27, 1999

(30) Foreign Application Priority Data

Nov. 14, 1997 (SE) ............................................. 9704174

(51) Int. Cl.[7] .................................................. A01J 5/00
(52) U.S. Cl. .................................. 119/14.08; 119/14.02
(58) Field of Search ........................ 119/14.01, 14.02, 119/14.03, 14.08, 14.18

(56) References Cited

U.S. PATENT DOCUMENTS

| 4,463,353 A | | 7/1984 | Kuzara | |
| 5,743,209 A | * | 4/1998 | Bazin et al. | 119/14.08 |
| 5,771,837 A | * | 6/1998 | van der Lely et al. | 119/14.02 |
| 5,778,820 A | * | 7/1998 | van der Lely et al. | 119/14.18 |
| 5,988,106 A | * | 11/1999 | van den Berg | 119/14.18 |

FOREIGN PATENT DOCUMENTS

| EP | 0638231 | 2/1995 |
| EP | 0639327 | 2/1995 |

* cited by examiner

Primary Examiner—Thomas Price
(74) Attorney, Agent, or Firm—Weingarten, Schurgin, Gagnebin & Lebovici LLP

(57) ABSTRACT

An automatic milking apparatus comprises a milking equipment having at least one teatcup (11), a robot arm (8) for attaching a teatcup to an animal's teat, an animal identification means (5, 6) for allowing identification of an animal individual, and an animal space (1) provided with an animal accepting/rejecting means (2) associated with a control means. A method of controlling the automatic milking apparatus is also described. According to the invention, said control means is programmed to allow an animal substantially in the beginning of its lactation period to be milked more often than in a later stage thereof.

40 Claims, 8 Drawing Sheets

AUTOMATIC MILKING APPARATUS

TECHNICAL FIELD OF THE INVENTION

Figure 1:
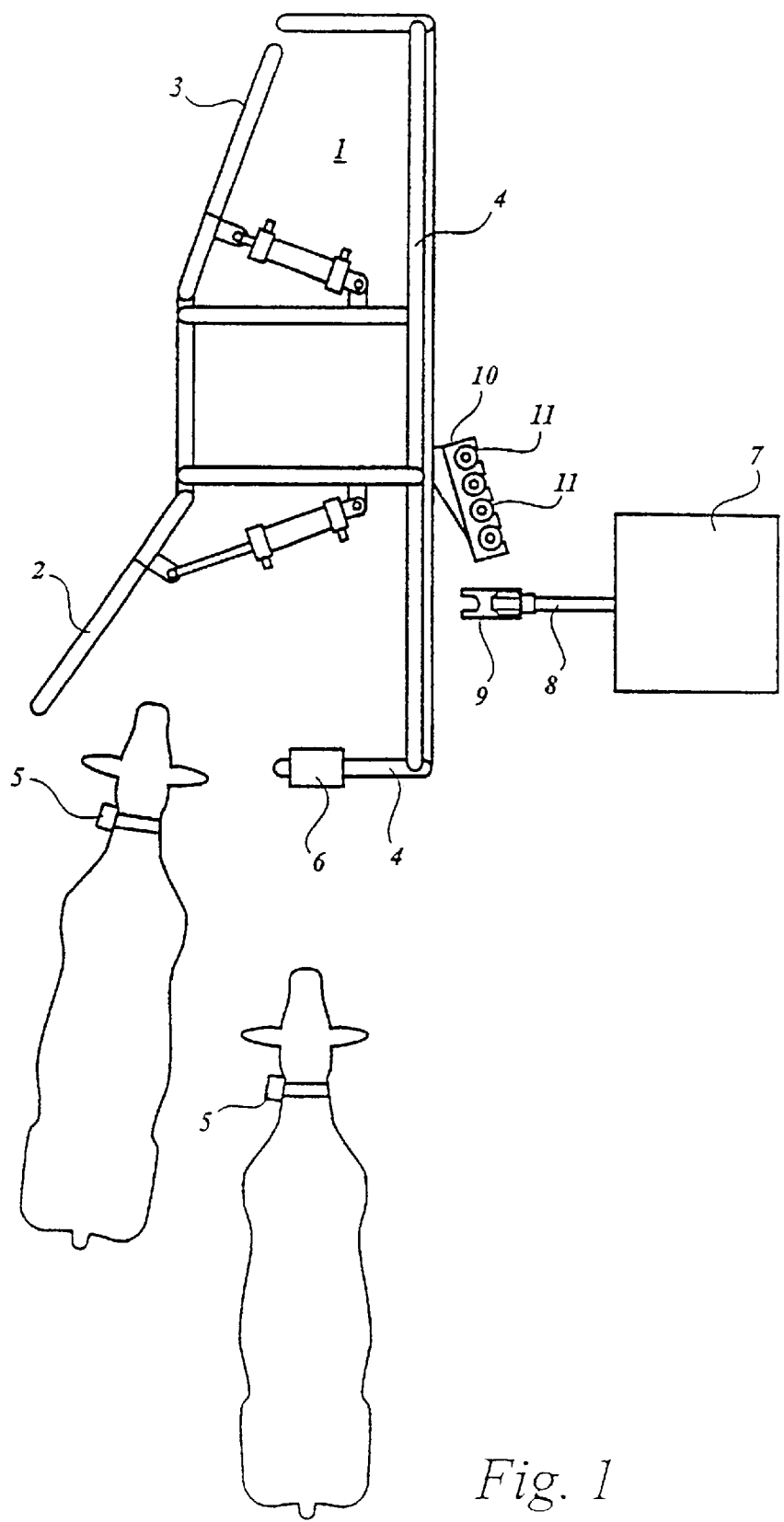

The present invention relates to an automatic milking apparatus comprising a milking equipment having at least one teatcup, a robot arm for attaching a teatcup to an animal's teat, an animal identification means for allowing identification of an animal individual, and an animal space provided with an animal accepting/rejecting means associated with a control means, said control means being programmed to allow an animal substantially in the beginning of its lactation period to be milked more often than in a later stage thereof.

The present invention also relates to a method of controlling said automatic milking apparatus.

An apparatus and a method of this kind is known from EP-A-0 638 231. This document describes an automatic milking apparatus comprising a milking robot and a computer system. The beginning of the lactation period of an animal is stored in the computer system and the computer system is of such a design that, depending on the beginning of the lactation period of the animal, the animal is urged e.g. by means of electric shocks to go to the milking robot a certain number of times per day.

The known apparatus suffers from the drawback that it does not at all consider the variation in a lactation curve.

A lactation curve describes the variation in the milk production. If the number of milking times is dependent on this curve the milking will get more effective. A lactation curve is also different for different animals and different breeds. It could also vary between the individuals in a herd.

SUMMARY OF THE INVENTION

It is accordingly the object of the present invention to overcome the problem of the known apparatus.

This problem has been solved by an apparatus of the initially defined kind, which is characterised in that said control means is switchable between at least two stages of the lactation period, a first stage starting at the beginning of the lactation period, a last stage ending towards the end of the lactation period, said lactation period being divided into stages having a variable length of at least one day.

It has also been solved by a method of the initially defined kind, which is characterised by including switching, by means of said control means, between at least two stages of the lactation period, a first stage starting at the beginning of the lactation period, a last stage ending towards the end of the lactation period and dividing said lactation period into stages having a variable length of at least one day.

Hereby, it is possible to set a predetermined number of milkings for each stage. Such that the milking becomes more efficient.

Preferably, at least one animal individual is allowed a certain number of milkings per day at at least one stage of the lactation period, and another certain number of milkings per day at at least one other stage of the lactation period. Hereby, it is possible to control the number of milkings regarding each animal individual.

Suitably, said lactation period is divided into stages having a length of at least one day, which means that the length may be at least one week or at least one month. Of course, the stages need not have the same length. On the contrary, the length of one stage may be different from the length of another stage. Accordingly, one period may have the length of a number of days, another period of a number of weeks, and yet another period of a number of months. This is due to the curve of the lactation period.

Preferably, the length of said stages is automatically set based on reference values. Hereby, it is possible to let the apparatus work completely autonomously.

Suitably, the length of said stages is set manually. Hereby, it is possible to set the length of the stages for each animal individual.

Preferably, the length of each stage for the whole lactation period is set before the beginning of the first stage. Hereby, it is possible to set the length of the stages for a typical breed of animals.

Suitably, the length of said stage is adaptable during the lactation period. Hereby, it is possible to adapt the length of a stage, during the lactation period, for each animal individual.

Preferably, the length of said stages is determined by measurement of the amount of extracted milk from an animal during a at least one milking, a threshold value of the amount determining the end of said stage. Hereby, it possible to automatically change from one stage to another.

Suitably, the length of said stages is predetermined for at least a part of a herd. Hereby, it is possible to set the stages outgoing from different parameters of the herd, even if they are all e.g. in the beginning of the lactation period. Such a parameter may be the normal milk yield for a part of the herd—another part of the herd may have another normal milk yield. Another parameter may be the size of the udder.

Preferably, the allowed number of milkings per day increases in the beginning of the lactation period towards a maximum point. Furthermore, the allowed number of milkings per day decreases from said maximum point towards the end of the lactation period. The said decrease of allowed number of milkings per day is substantially continuous.

Hereby, the number of milkings will be adapted to a normal curve of the lactation period.

Suitably, the allowed number of milkings per day for an animal individual is not less than 1 milking per day and no more than 6 milkings per day. Hereby, the control means is given limits so that an animal individual is not forgotten to be milked or is milked too much, in which case the dairy maid should be alarmed by a suitable signal.

Preferably, said control means is programmed to allow said animal to be milked only after a minimum time interval from a previous milking. Hereby is prevented that an animal individual is milked the allowed number of milkings per day in a row, i.e. during a short period of time, which would result in that after the allowed number of milkings, that animal individual would not be milked again until the next day, which in turn could be very painful for the animal.

Suitably, said accepting/rejecting member is a gate allowing or preventing access to said animal space.

Preferably, said gate is adapted in a first position to accept access of said animal into said animal space, but to prevent access into a waiting area, and in a second position to accept access of said animal into a waiting area but to prevent access into said animal space. Hereby, the gate will select animals that are allowed to be milked from animals that are not allowed to be milked.

In the apparatus according to EP-A-0 551 957, the control means gives priority between animals, which means that in case two cows of different rank are identified substantially simultaneously, the cow of lower rank may be allowed to enter the milking stall before the cow of higher rank. This may cause a crowd of jostling and jamming cows at the entrance of the milking stall, which in turn causes inefficient use of the automatic milking apparatus.

The apparatus according to EP 0 638 231 does not at all consider the fact that two or more cows may simultaneously be standing close to the milking stall, wanting to enter the milking stall.

Animals that live in herds, such as cows, have a strict hierarchy over one another. Accordingly, in case a group of cows are standing close to the automatic milking machine, e.g. at the entrance gate of a milking stall, and two of them happen to be identified more or less simultaneously by an identification means arranged close to the entrance gate, the cow of higher rank in the hierarchy would normally enter the milking stall before the cow of lower rank.

According to the invention, an animal allowed to be milked and is standing at a first distance from said sensor, is given priority to enter said milking space in relation to an animal allowed to be milked and standing at a second distance from said sensor, said second distance being larger than said first distance. Hereby, as an animal of higher rank in the hierarchy will normally force itself to enter a milking stall before an animal of a lower rank, the animal of higher rank will be allowed to enter the milking stall, as it will then be standing closer to the milking stall.

DRAWING SUMMARY

DETAILED DESCRIPTION OF THE INVENTION

FIG. 1 shows a an animal space 1, in the form of a milking stall, defined by an entrance gate 2, an exit gate 3 and railings 4.

Each cow is provided with a collar mounted transponder 5, which interacts with a transponder reader 6 arranged at the entrance of the stall 1, when a cow is in the vicinity thereof. The cow will then be identified, and it will be established in a control means (not shown) associated with the entrance gate 2, whether the cow should be allowed to enter the stall 1 or not. Accordingly, the stall gate 2 constitutes a cow accepting/rejecting means.

A milking robot 7 comprising a robot arm 8 with a gripper 9 and a teatcup rack 10 with teatcups 11 are provided for allowing attachment of a teatcup 11 onto each teat of the animal to be milked The teat location and teatcup attachment is performed in a known manner and is not part of the invention.

Figure 2:
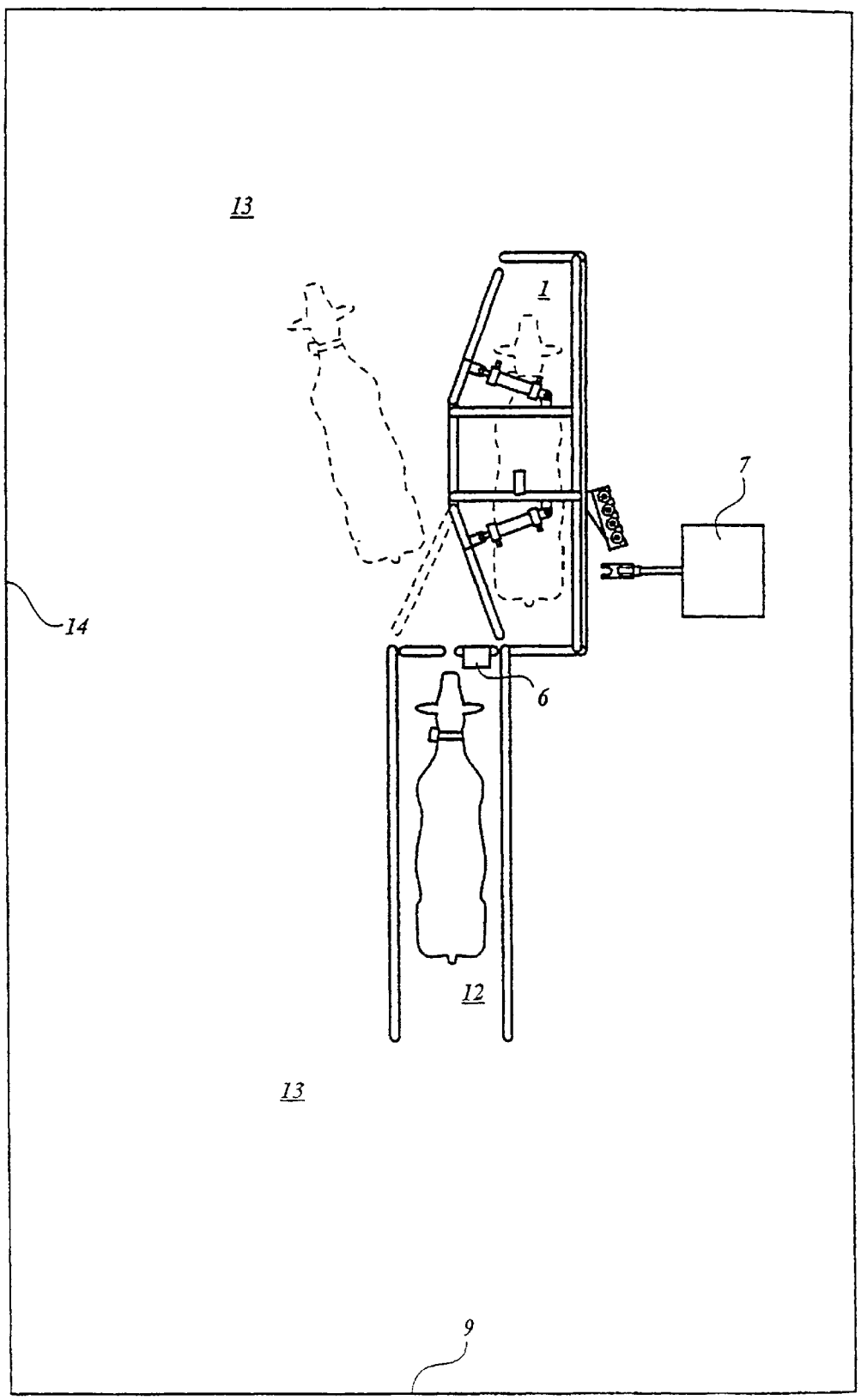

In FIG. 2, a selection stall 12 is associated with the milking stall 1 in such a way that only one cow at a time will be allowed to be identified by the transponder reader 6. A cow that is not allowed to enter the stall, will instead be let into a residing area 13 where it came from, when entering the selection stall 12. The residing area 13 is defined by a fence or a wall 14.

Figure 3:
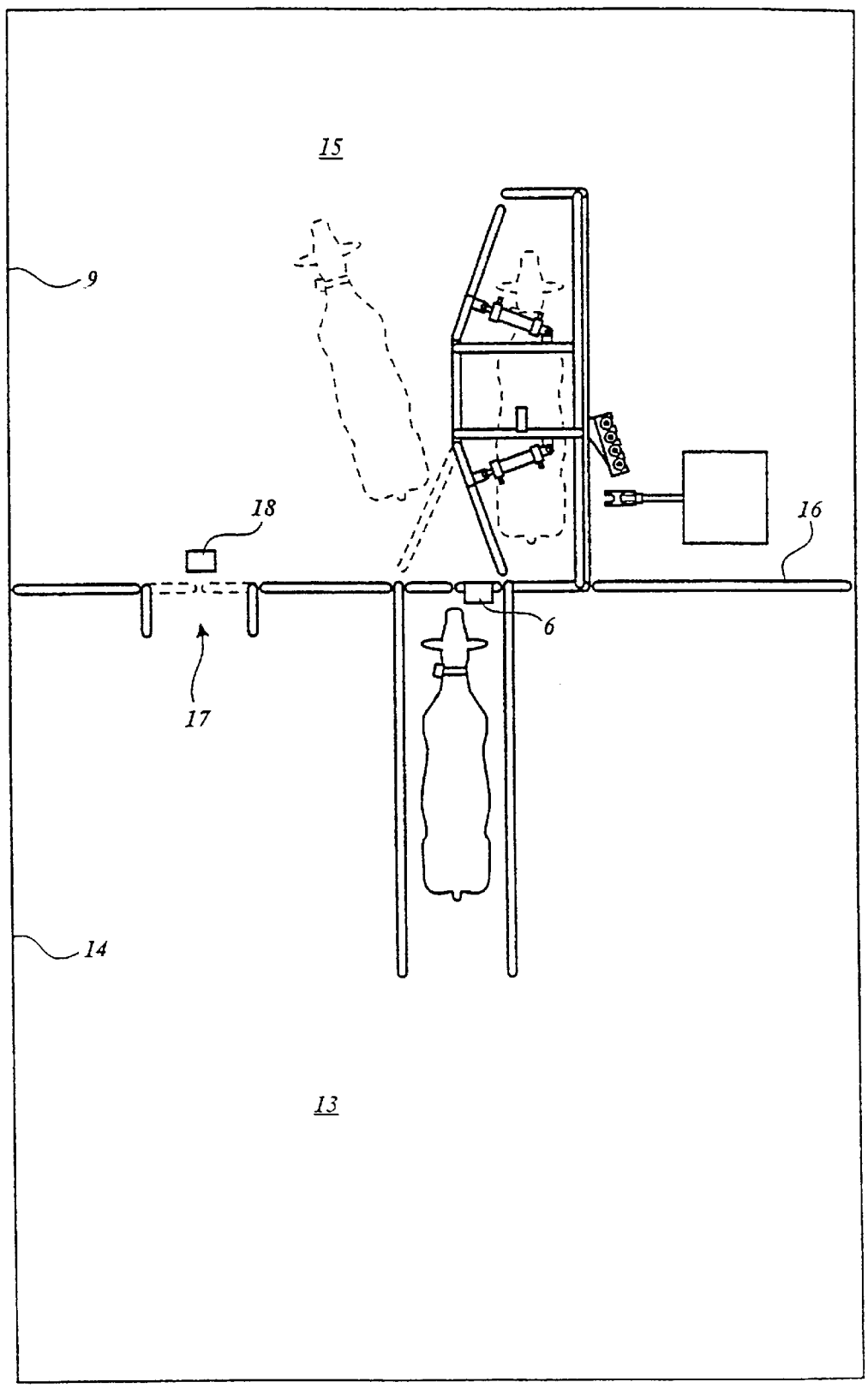

In FIG. 3, the selection stall 12 instead leads into a second residing area 15, in which cows that are not allowed to be milked for a while are to reside. Also the exit gate 3 of the milking stall 1 leads to that area. The first and second residing areas 13, 15 are defined by a wall or fence 14 and by a further wall or fence 16, dividing said areas. The wall or fence 16 is provided with a gate 17 associated with a further transponder reader 18, such that cows that should be allowed to be milked in a near future may enter the first residing area 13 for achieving access to the milking stall 1.

Figure 4:
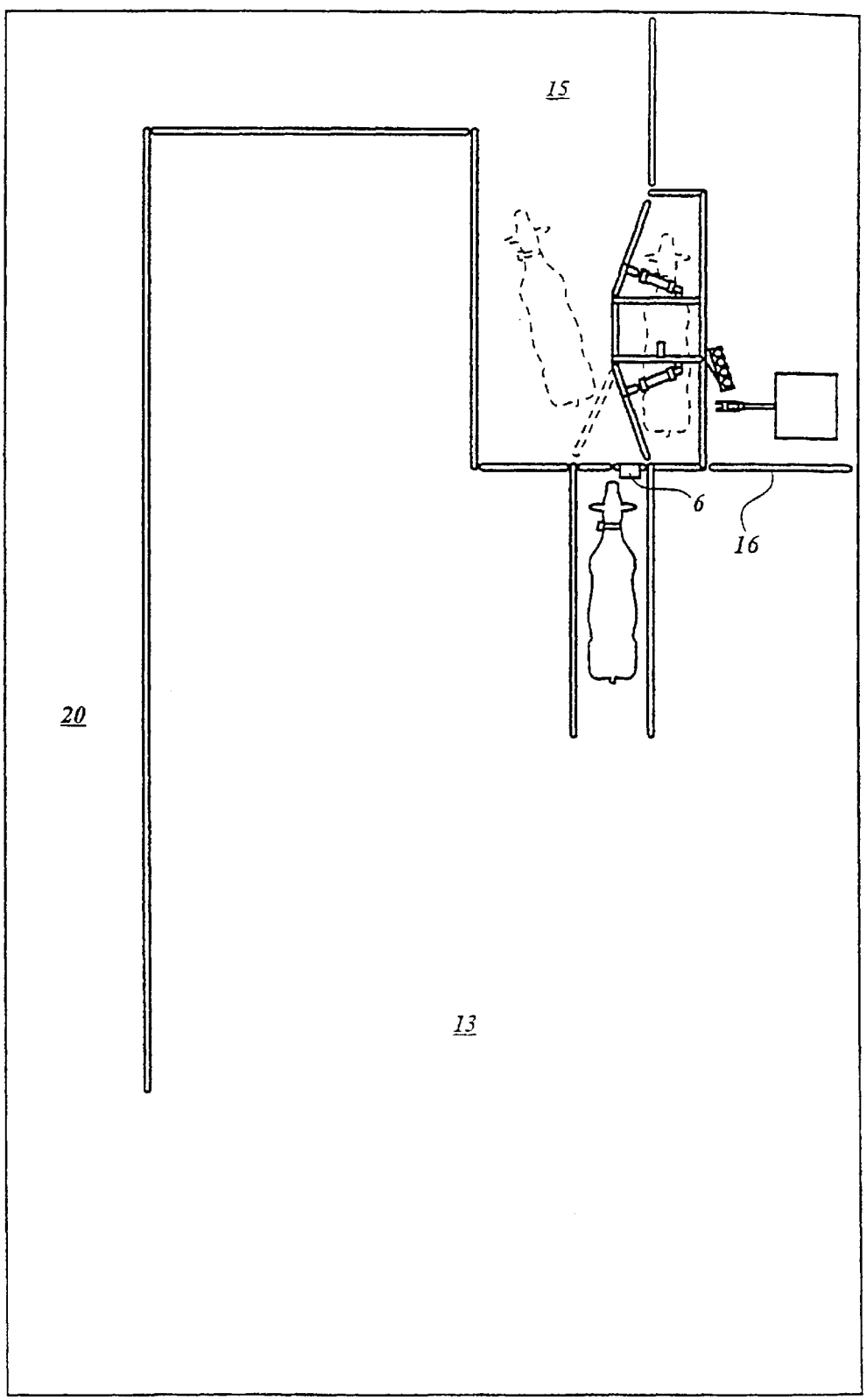

FIG. 4 illustrates a further possibility of arranging the milking stall of FIG. 2 in a stall. Cows that have been milked, as well as cows that are not allowed to be milked, enter the second area 15. The second area 15 is connected to the first residing area by a corridor 20, which is long enough to delay newly milked cows and other cows that are not allowed to be milked in their attempts to try to enter the milking stall again.

Figure 5A:
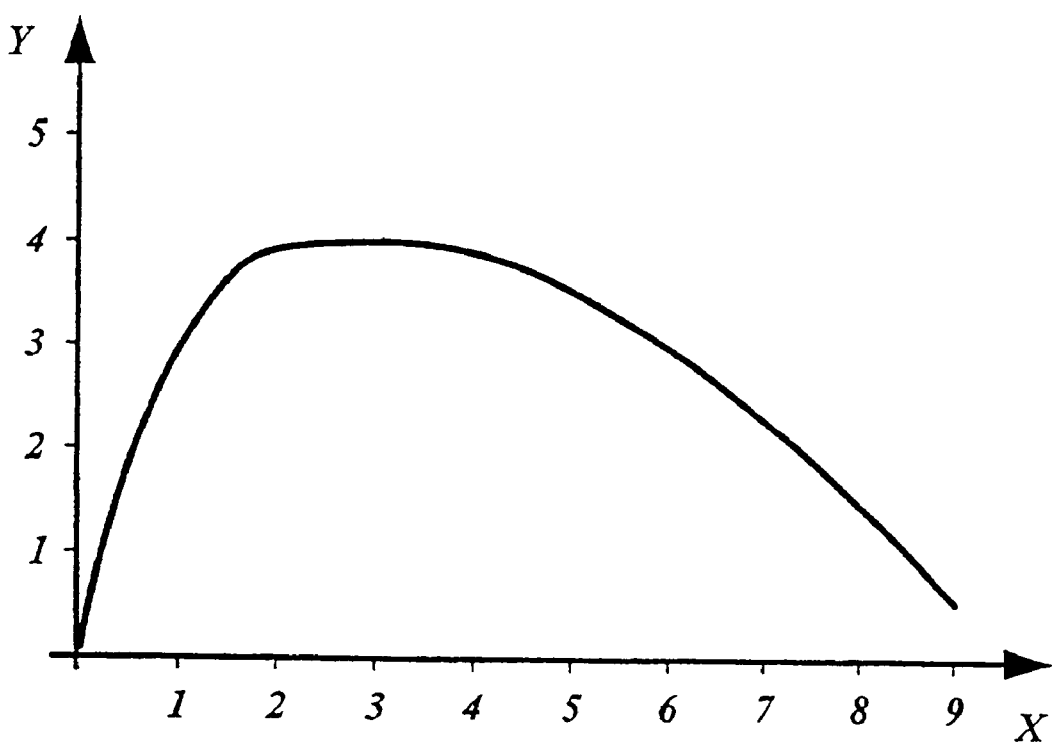

FIG. 5a is a diagram showing a typical curve of a lactation period of a cow, the diagram having an X-axis regarding the lactation time (months)-and a Y-axis regarding the recommended number of milkings per day.

Of course, the curves will look differently for other milking animals, such as sheep, goats, buffaloes and horses. For such animals, it will of course be possible to create suitable curves.

Figure 5B:
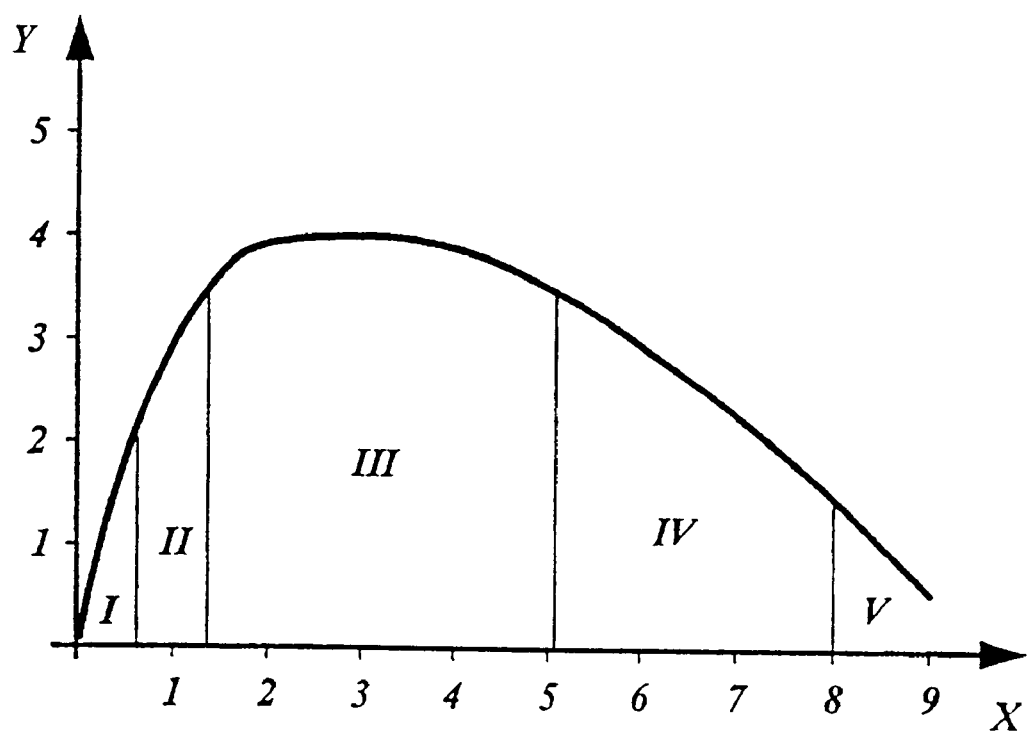

FIG. 5b shows a lactation period divided into five stages I, II, III, IV and V. The different stages of the lactation period may be used for a whole herd of a mixture of breeds, a whole herd of the same breed, a part of a herd or for a cow individual.

Figure 5C:
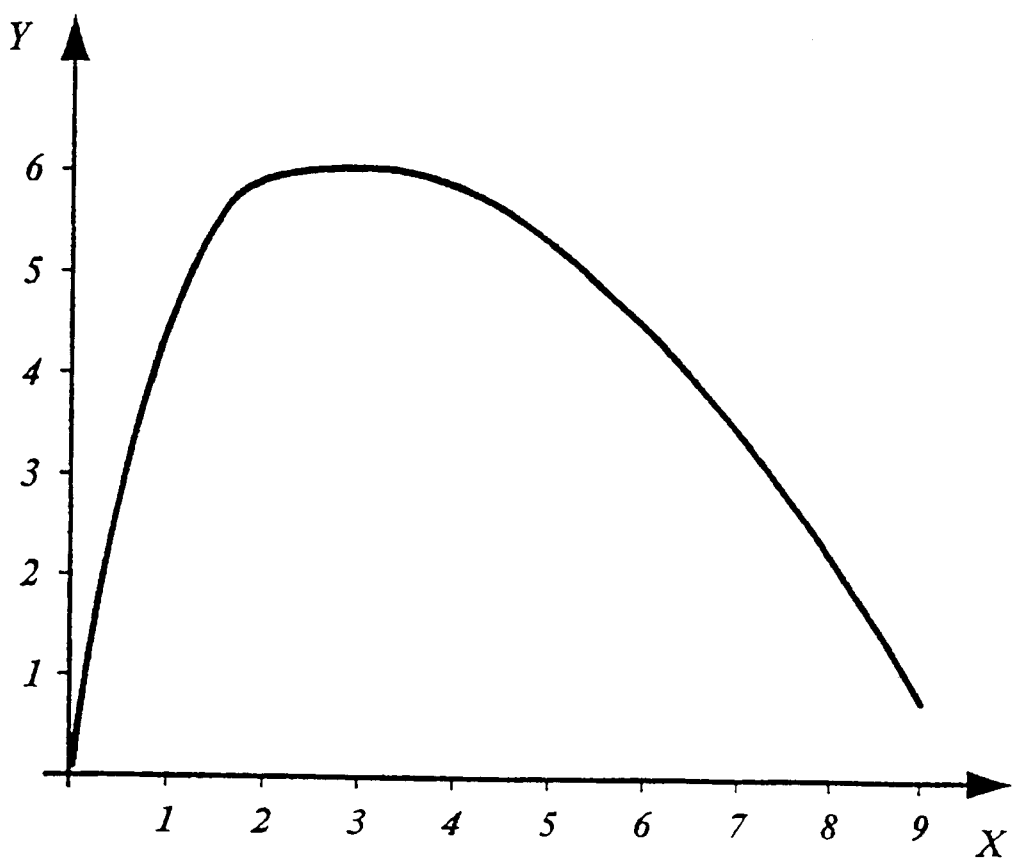
Figure 5D:
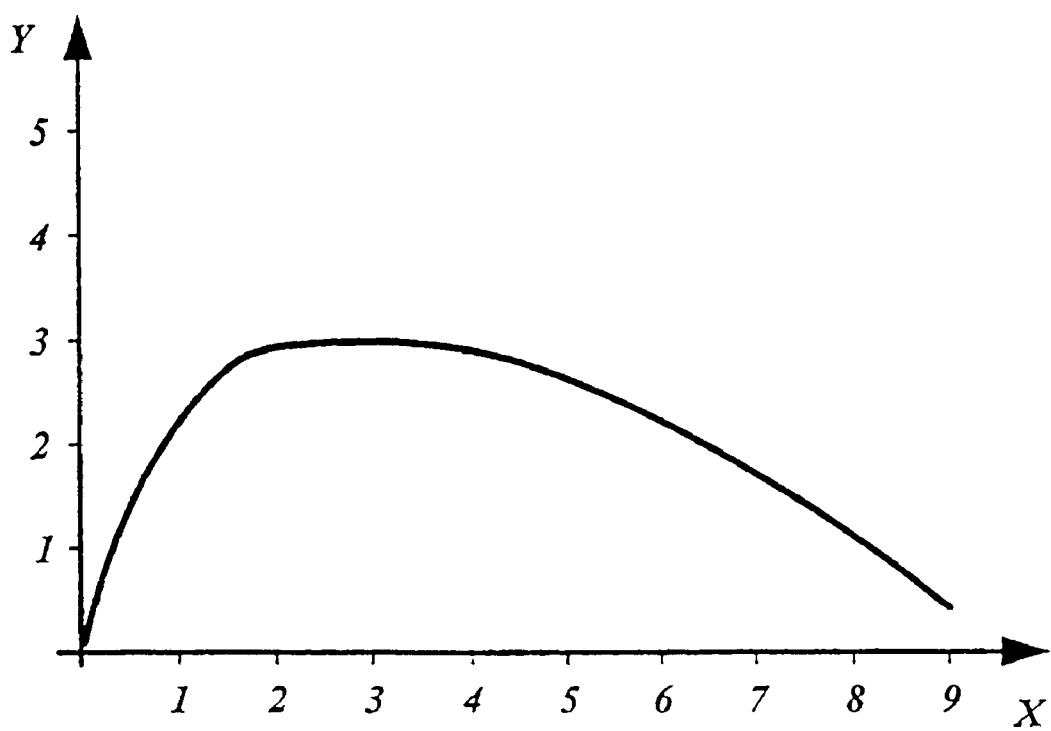

In case the curve is not representative for a particular breed, a particular herd, a particular part of a herd or a particular cow individual, another standard curve may be used, such as the ones showed in FIGS. 5c and 5d, respectively. It should however be noted that the curves shown in FIGS. 5a to 5d are only examples of standard curves. Such standard curves may be supplied by the milking robot supplier for a particular breed. Alternatively, a typical lactation curve may be manually set in the control means of the milking robot, for a particular breed or a particular animal. The curves may be stored in the control means, either as a continuous curve or as a stepped function.

Alternatively or additionally, the number of stages may be manually set for a herd, a part of the herd or for a particular animal.

Furthermore, the start of the lactation period is entered into the control means, preferably by the dairy maid, when the cow has calved In case it turns out that a selected standard curve allows the cow to be milked too often or too seldom, the dairy maid may then either exchange the standard curve, or manually change the number of milkings per day, or manually change the duration of the stage or stages.

In order to perform the change of stages or numbers of milkings automatically, the amount of extracted milk may be used as basis therefor. Accordingly, in case the extracted amount of milk is above a predetermined limit the control means allows the cow individual to be milked e.g. one time per day. However, in case the extracted amount of milk is under a predetermined limit, the control means allows that cow individual to be milked e.g. one less occasion per day.

Likewise, the exacted amount of milk may be used as a threshold value for determination of the end of a stage.

What is claimed is:

1. An automatic milking apparatus comprising a milking equipment having at least one teatcup, a robot arm for attaching a teatcup to an animal's teat, an animal identification means for allowing identification of an animal individual, and an animal space provided with an animal accepting/rejecting means associated with a control means, said control means being programmed to allow an animal substantially in the beginning of its lactation period to be milked more often than in a later stage thereof, characterised in that said control means is switchable between at least two stages of the lactation period, a first stage starting at the beginning of the lactation period, a last stage ending towards the end of the lactation period, said lactation period being divided into stages having a variable length of at least one day.

2. An apparatus according to claim 1, wherein at least one animal individual is allowed a certain number of milkings per day at at least one stage of the lactation period, and another certain number of milkings per day at at least one other stage of the lactation period.

3. An apparatus according to claim 1, wherein said lactation period is divided into stages having a length of at least one week.

4. An apparatus according to claim 1, wherein said lactation period is divided into stages having a length of at least one month.

5. An apparatus according to claim 1, wherein the length of one stage may be different from the length of another stage.

6. An apparatus according to claim 1, wherein the length of said stages is automatically set based on reference values.

7. An apparatus according to claim 1, wherein the length of said stages is set manually.

8. An apparatus according to claim 1, wherein the length of each stage for the whole lactation period is set before the beginning of the first stage.

9. An apparatus according to claim 1, wherein the length of said stage is adaptable during the lactation period.

10. An apparatus according to claim 1, wherein said the length of said stages is determined by measurement of the amount of extracted milk from an animal during a at least one milking, a threshold value of the amount determining the end of said stage.

11. An apparatus according to claim 1, wherein the length of said stages is predetermined for at least a part of a herd.

12. An apparatus according to claim 1, wherein the allowed number of milkings per day increases in the beginning of the lactation period towards a maximum point.

13. An apparatus according to claim 12, wherein the allowed number of milkings per day decreases from said maximum point towards the end of the lactation period.

14. An apparatus according to claim 13, wherein the said decrease of allowed number of milkings per day is substantially continues.

15. An apparatus according to claim 1, wherein the allowed number of milkings per day for an animal individual is not less than 1 milking per day and no more than 6 milkings per day.

16. An apparatus according to claim 1, wherein said control means is programmed to allow said animal to be milked only after a minimum time interval from a previous milking.

17. An apparatus according to claim 1, wherein said accepting/rejecting member is a gate allowing or preventing access to said animal space.

18. An apparatus according to claim 17, wherein said gate is adapted in a first position to accept access of said animal into said animal space, but to prevent access into a waiting area, and in a second position to accept access of said animal into a waiting area but to prevent access into said animal space.

19. An apparatus according to claim 17, wherein an animal allowed to be milked and is standing at a first distance from said sensor, is given priority to enter said animal space in relation to an animal allowed to be milked and standing at a second distance from said sensor, said second distance being larger than said first distance.

20. A method according to claim 2, including setting a predetermined length of said stages for at least a part of a herd.

21. An apparatus according to claim 2, wherein:
said lactation period is divided into stages having a length of at least one week;
said lactation period is divided into stages having a length of at least one month;
the length of one stage may be different from the length of another stage;
the length of each stage for the whole lactation period is set before the beginning of the first stage;
the length of said stage is adaptable during the lactation period;
said the length of said stages is determined by measurement of the amount of extracted milk from an animal during at least one milking, a threshold value of the amount determining the end of said stage;
the length of said stages is predetermined for at least a part of a herd;
the allowed number of milkings per day increases in the beginning of the lactation period towards a maximum point;
the allowed number of milkings per day decreases from said maximum point towards the end of the lactation period;
the said decrease of allowed number of milkings per day is substantially continuous;
the allowed number of milkings per day for an animal individual is not less than 1 milking per day and no more than 6 milkings per day;
said control means is programmed to allow said animal to be milked only after a minimum time interval from a previous milking;
said accepting/rejecting member is a gate allowing or prevent access to said animal space;
said gate is adapted in a first position to accept access of said animal into said animal space, but to prevent access into a waiting area, and in a second position to accept access of said animal into a waiting area but to prevent access into said animal space;
an animal allowed to be milked and is standing at a first distance from said sensor, is given priority to enter said animal space in relation to an animal allowed to be milked and standing at a second distance from said sensor, said second distance being larger than said first distance.

22. A method of controlling an automatic milking apparatus, which comprises a milking equipment having at least one teatcup, a robot arm for attaching a teatcup to an animal's teat, an animal identification means for allowing identification of an animal individual, and an animal space provided with an animal accepting/rejecting means associated with a control means, said control means allowing an animal substantially in the beginning of its lactation period to be milked more often than in a later stage thereof, characterised by including switching, by means of said control means, between at least two stages of the lactation period, a first stage starting at the beginning of the lactation period, a last stage ending towards the end of the lactation period and dividing said lactation period into stages having a variable length of at least one day.

23. A method according to claim 22, including allowing at least one animal individual a certain number of milkings per day at at least one stage of the lactation period, and another certain number of milkings per day at at least one other stage of the lactation period.

24. A method according to claim 22, including dividing said lactation period into stages having a length of at least one week.

25. A method according to claim 22, including dividing said lactation period into stages having a length of at least one month.

26. A method according to claim 22, including setting the length of one stage differently from the length of another stage.

27. A method according to claim 22, including automatically setting the length of said stages is automatically set based on reference values.

28. A method according to claim 22, including manually setting the length of said stages.

29. A method according to claim 22, including setting the length of each stage for the whole lactation period before the beginning of the first stage.

30. A method according to claim 22, including adapting the length of said stage during the lactation period.

31. A method according to claim 22, including determining the length of said stages by measurement of the amount of extracted milk from an animal during at least one milking, a threshold value of the amount determining the end of said stage.

32. A method according to claim 22, including increasing the allowed number of milkings per day in the beginning of the lactation period towards a maximum point.

33. A method according to claim 32, including decreasing the allowed number of-milkings per day from said maximum point towards the end of the lactation period.

34. A method according to claim 33, including decreasing the allowed number of milkings per day substantially continuously.

35. A method according to claim 22, including allowing the number of milkings per day for an animal individual to be not less than 1 milking per day and no more than 6 milkings per day.

36. A method according to claim 22, including allowing said animal to be milked only after a minimum time interval from a previous milking.

37. A method according to claim 22, including allowing or preventing access to said animal space by means of said accepting/rejecting member, said accepting/rejecting member being a gate.

38. A method according to claim 37, including
   accepting access of said animal into said animal space when said gate is in a first position, but to preventing access into a waiting area, and
   accepting access of said animal into a waiting area when said gate is in a second position, but to prevent access into said animal space.

39. An apparatus according to claim 37, including giving priority to an animal allowed to enter said milking space and is standing at a first distance from said sensor, in relation to an animal, which is allowed to be milked and is standing at a second distance from said sensor, said second distance being larger than said first distance.

40. A method according to claim 23, including:
   dividing said lactation period into stages having a length of at least one month;
   setting the length of one stage differently from the length of another stage;
   setting the length of each stage for the whole lactation period before the beginning of the first stage;
   adapting the length of said stage during the lactation period;
   determining the length of said stages by measurement of the amount of extracted milk from an animal during at least one milking, a threshold value of the amount determining the end of said stage;
   setting a predetermined length of said stages for at least a part of a herd;
   increasing the allowed number of milkings per day in the beginning of the lactation period towards a maximum point;
   decreasing the allowed number of milkings per day from said maximum point towards the end of the lactation period substantially continuously;
   allowing the number of milkings per day for an animal individual to be not less than 1 milking per day and no more than 6 milkings per day;
   allowing said animal to be milked only after a minimum time interval from a previous milking;
   allowing or preventing access to said animal space by means of said accepting/rejecting member, said accepting/rejecting member being a gate;
   accepting access of said animal into said animal space when said gate is in a first position, but to preventing access into a waiting area, and accepting access of said animal into a waiting area when said gate is in a second position, but to prevent access into said animal space; and
   giving priority to an animal allowed to enter said milking space and is standing at a first distance from said sensor, in relation to an animal, which is allowed to be milked and is standing at a second distance from said sensor, said second distance being larger than said first distance.

* * * * *

UNITED STATES PATENT AND TRADEMARK OFFICE
CERTIFICATE OF CORRECTION

PATENT NO.    : 6,394,028 B1
DATED         : May 28, 2002
INVENTOR(S)   : Uzi Birk It is certified that error appears in the above-identified patent and that said Letters Patent is hereby corrected as shown below:

Column 3,
Line 26, after DRAWING SUMMARY, please insert the following paragraph:
-- The invention will now be described more closely with reference to the accompanying drawings, in which
Figure 1 is schematic presentation of a top view of a milking stall
Figure 2 illustrates the milking stall shown in figure 1, including a selection stall.
Figure 3 illustrates the milking stall shown in figure 2, leading from a first residing area to a second residing area.
Figure 4 illustrates the milking stall shown in figure 2, leading to a return lane.
Figures 5a to 5d are diagrams of lactation periods. --;

Column 5,
Line 24, "said the" should read -- the --; and
Line 26, "a at" should read -- at --.

Signed and Sealed this

Fourteenth Day of October, 2003

JAMES E. ROGAN
*Director of the United States Patent and Trademark Office*